Feb. 12, 1935.  C. J. WERNER  1,991,042

MOTOR CONTROL STRUCTURE

Filed June 29, 1934   2 Sheets—Sheet 1

INVENTOR
Calvin J. Werner
BY
Spencer Hardman & Fehr
his ATTORNEYs

Feb. 12, 1935.   C. J. WERNER   1,991,042
MOTOR CONTROL STRUCTURE
Filed June 29, 1934    2 Sheets-Sheet 2

INVENTOR
Calvin J. Werner
BY
Spencer Hardman & Fehr
his ATTORNEYS

Patented Feb. 12, 1935

1,991,042

UNITED STATES PATENT OFFICE 1,991,042

MOTOR CONTROL STRUCTURE

Calvin J. Werner, Dayton, Ohio, assignor to General Motors Corporation, Detroit, Mich., a corporation of Delaware Application June 29, 1934, Serial No. 732,971

7 Claims. (Cl. 172—279)

This invention relates to a control system, and more particularly to the structure for effecting control responsive to the operating of an electric motor.

It is an object of this invention to provide control means for an electric motor, which control means is low in production cost and easy to manufacture and assemble.

Another object of this invention is to provide means for controlling an electric motor, which means is conservative of space and number of parts.

Another object of this invention is to provide means for controlling the starting and running circuits of a single phase induction motor.

Further objects and advantages of the present invention will be apparent from the following description, reference being had to the accompanying drawings wherein a preferred embodiment of the present invention is clearly shown.

Figure 1:
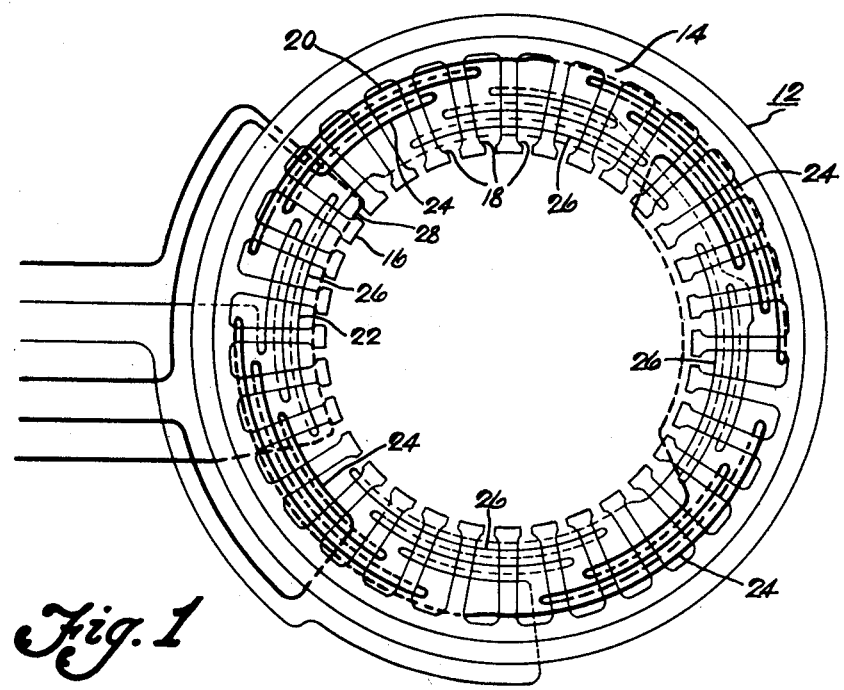
Fig. 1 is a diagrammatic view of a motor stator showing the relative positions of the windings in a preferred form of the present invention.
Figure 2:
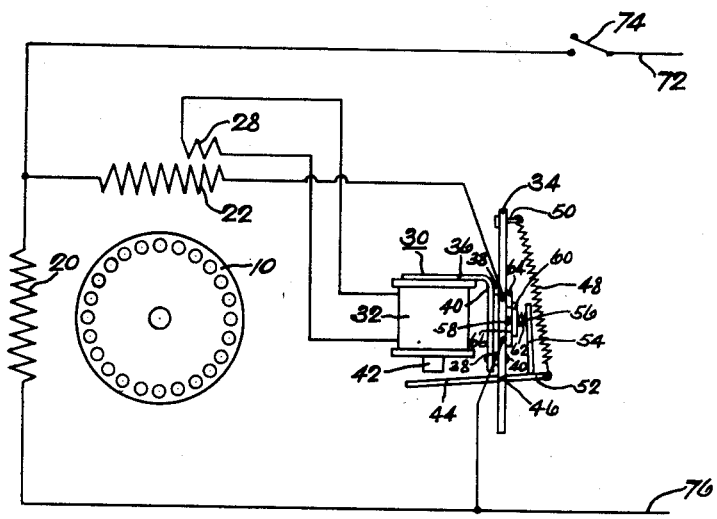
Fig. 2 is a circuit diagram showing the electrical connections of a motor embodying a preferred form of the present invention.

With particular reference to Figs. 1 and 2, an electric motor comprises a rotor 10 that is preferably of the conventional squirrel cage type, which rotor is in co-operative relation with a stator 12. The stator 12 includes a core 14, which core has a central circular opening 16 therein, and is provided with substantially radially extending slots 18 that open into the central opening 16. Main and auxiliary field windings 20 and 22 respectively, are wound in the slots 18. The main field winding 20 is divided into sections 24; while the auxiliary field winding 22 is divided into sections 26. The sections of the main and auxiliary field windings each provide magnetic poles, and the sections of the two windings are alternately situated, and displaced from each other by substantially 90 electrical degrees. A third winding 28 is preferably mounted in the same slots with portions of one section of the auxiliary field winding 22, the structure and details of which third winding will be more fully discussed.

The control device or relay 30 has an actuating electromagnet 32, the ends of the winding of which electromagnet are connected to the ends of the third winding 28. The electromagnet 32 is secured to an insulating support member 34 by a bracket 36, which bracket is preferably spaced from the support member 34 by spacing washers 38, and is secured to the support member 34 by rivets 40 or other suitable fastening means. The electromagnet 32 has a core 42 that is magnetically associated with an armature 44. The armature 44 is pivotally supported by the support member 34 at 46, and is normally biased away from the core 42 by a spring 48. The spring 48 has one end anchored to a member 50 that is secured to the support member 34, and has its other end connected to the lever portion 52 of the armature 44. The contact carrying arm 54 is preferably integrally formed with the armature 44, and preferably extends in angular relation with the armature. A pin 56, having an enlarged end portion 58, is secured at its other end to the contact carrying arm 54 near the end thereof, and projects toward the insulating support member 34. This pin 56 rests against the insulating support member 34 when the armature is in its normal position, and thus provides a stop which arrests motion of the armature 44 away from the core 42, which motion is effected by the biasing force of the spring 48. A preferably disc-like contact member 60 is slidably mounted on the pin 56, and is urged away from the contact carrying arm 54 by a spring 62. The enlarged end portion 58 prevents the contact 60 from slipping off of the pin 56. Stationary contacts 64 and 66 are mounted on the insulating support member 54, so that when the armature is biased away from the core 42 by the spring 48, the contact 60 bridges the contacts 64 and 66 to provide an electrical connection therebetween. Lugs 68 and 70 are secured to contacts 64 and 66 respectively, for making electrical connections to those contacts.

An end of the main field winding 20 is connected to one end of the auxiliary field winding 22, and to the power supply line 72 through a line switch 74. The other end of the main field winding is connected to a power supply line 76. The other end of the auxiliary field winding 22 is connected to the contact 64; while the contact 66 is connected to the power supply line 76, so that when the contact 60 bridges the contacts 64 and 66, a circuit is closed from the power supply line 76 to the end of the auxiliary field winding. Then, when the electromagnet 32 attracts the armature 44 to effect disengagement of the contact 60 from the contacts 64 and 66, the circuit from the power supply line 76 to the auxiliary field winding 22 is opened.

With particular reference to Figs. 3, 4, 5, and 6, reference numerals similar to those previously used refer to similar parts that perform similar functions. In the preferred embodiment of the present invention, the previously mentioned third winding 28 preferably comprises a preformed strip of conductive material such as that shown in Fig. 4. The strip is formed into substantially a U-shape having sides 78 and 80, and a connecting portion 82. The sides 78 and 80 have holes 84 and 86 respectively, near the ends thereof. The slots 18 are preferably lined with paper or other suitable insulating material, as indicated at 88, and the windings 20 and 22 are held in position by wedges of insulating material such as 90. The sides 78 and 80 of the strip that comprises the third winding 38 are preferably mounted in the same slots with sides of the auxiliary field winding 22, so that the third winding is substantially concentrically located circumferentially with respect to the one section of the auxiliary field winding. The sides 78 and 80 are also preferably located near the open ends of the slots, intermediate the field windings and the wedges 90. These sides are insulated from the windings, and the insulating lining 88 serves to insulate the sides 78 and 80 from the core 14. The strip that comprises the third winding 28 is preferably made by preforming or bending a comparatively flat strip of conducting material, such as copper, as at 92 and 94. The sides 78 and 80 are also preferably bent as at 96 and 98, and 100 and 102 respectively, so that the ends of the strip that project beyond the end of the core 14 provide a mounting support for the relay or control device 30.

The relay 30 is secured to the ends of the strip by screws, or other suitable fastening means 104, and the ends of the winding of the electromagnet 32 are electrically connected to the ends of the strip thru the screws 104.

Figure 5:
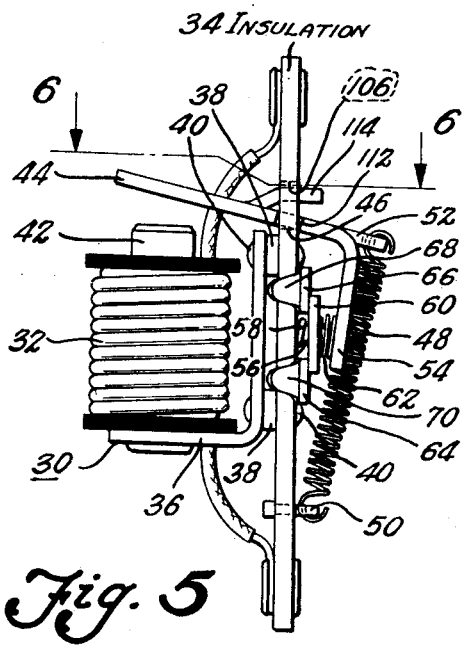
Fig. 5 is a side elevation of a preferred form of control relay.
Figure 6:
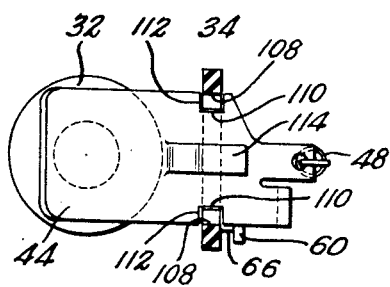
Fig. 6 is a sectional view of the control relay shown in Fig. 5, and is taken substantially on the line 6—6 of Fig. 5, and in the direction of the arrows.

Figs. 5 and 6 show more in detail the pivotal mountings for the armature 44. The insulating support member 34 has an opening 106 therein, which opening has a portion 108 that is wider than the portion 110 thereof. In fact, portion 108 is wide enough to permit the armature 44 to be inserted into the opening. The armature 44 has notches 112 in the sides thereof, so that when the armature is in position, the portion of the armature between the notches 112 fits into the smaller portion 110 of the opening 106. The notches 112 are sufficiently wide to permit rocking movement of the armature. A tongue 114 is preferably integral with the armature, and is bent away from the armature after the armature is inserted into the opening 106, so that it provides a stop to prevent the armature from becoming displaced.

Figure 3:
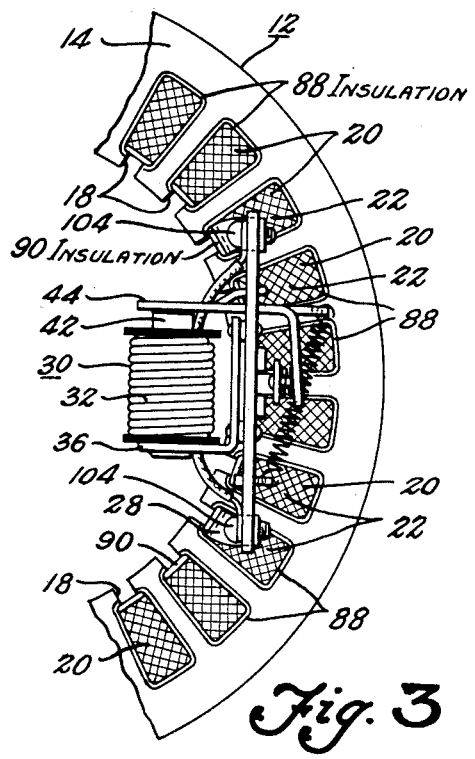
Fig. 3 is a fragmentary sectional view of the motor stator, and indicates a preferred structure embodying the present invention.

Figs. 2 and 5 show the relay 30 in its normal position, with the armature biased away from the core 42 by the spring 48 and the contacts closed; while Fig. 3 shows the relay with the armature attracted to the core 42 and the contact 60 open.

When the line switch 74 is closed, both the main and auxiliary field windings 20 and 22 respectively, are energized to start the motor. The rotor currents create a magnetic field about the rotor, the flux of which field cuts the third winding 28 with increasing rapidity as the rotor speed increases. The increasing rate at which the third winding is cut by the rotor flux effects a corresponding increase in the voltage induced in the third winding, and the voltage across the third winding. The third winding is preferably located near the open ends of the slots and near the rotor, as shown in Fig. 3, so that its magnetic coupling with the rotor is thereby increased. The increase in the voltage across the third winding increases the ampere turns of the electromagnet 32 in response to the increasing rotor speed. The tension of the spring 48 is preselected so that at a substantially predetermined rotor speed, the armature 44 is attracted toward the core 42 to separate the contact 60 from the contacts 64 and 66 to open the circuit to the auxiliary field winding 32. This establishes the running circuit. By placing the third winding 28 substantially concentric circumferentially with respect to one section or pole of the auxiliary field winding, the resultant coupling with the main field winding is substantially zero, since the voltages induced in the two sides of the third winding from the main field winding are substantially equal and opposite. Magnetic coupling with the auxiliary field winding 22 is preferable, since the auxiliary field winding circuit is open when the motor is running, so that substantially no voltage is induced in the third winding from the field windings during running that will tend to hold the relay operated if the rotor speed is decreased by an overload or drop in line voltage.

Figure 4:
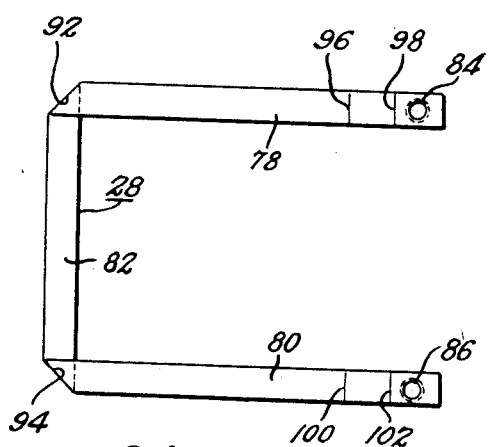
Fig. 4 is an elevation of the winding and relay support member utilized in a preferred form of the present invention, as indicated in Fig. 3.

The single turn coil provided by the preformed strip shown in Fig. 4 has sufficient voltage produced therein by the rotor flux to properly actuate the relay shown. This structure is economical since this type of third winding is easily inserted after the motor windings are in place, and also because the third winding structure provides a support for the relay. Furthermore, the relay is mounted within the motor housing, and consequently does not require a separate housing. The structure is convenient because the connections between the ends of the third winding and the relay electromagnet are made so that the screws which hold the relay support member to the ends of the strip also serve as binding posts for connecting the ends of the electromagnet winding to the ends of the third winding.

While the embodiment of the present invention as herein disclosed, constitutes a preferred form, it is to be understood that other forms might be adopted, all coming within the scope of the claims which follow.

What is claimed is as follows:

1. In combination with a motor having a stator core, said stator core having slots therein and field coils in the slots, a substantially U-shape conductor mounted in said slots so that the sides thereof extend through separate slots and project beyond the ends of the slots, a relay supported by said conductor and having an electromagnet electrically connected to the ends of said conductor, and a control element actuated by the electromagnet in response to voltage induced in said conductor.

2. In combination with a motor having a stator core, said stator core having slots therein and field windings in the slots, said windings being divided into sections to provide magnetic poles, a substantially U-shaped conductor mounted in said slots and having sides in the same slots with one of the sections of one of said windings, a relay supported by the ends of said conductors and having an electromagnet electrically connected to said ends, and a control element actuated by the electromagnet in response to voltage induced in said conductor.

3. In combination with a motor having a stator core, said stator core having slots therein and field windings in the slots, said windings being divided into sections to provide magnetic poles, a substantially U-shaped conductor mounted in said slots and substantially concentrically located circumferentially with respect to one of the sections of one of said windings, a relay supported by the ends of said conductor and having an electromagnet electrically connected to said ends, and a control element actuated by the electromagnet in response to voltage induced in said conductor.

4. In combination with a motor having a stator including a core, said core having slots therein and main and auxiliary field windings in the slots, each of said windings being divided into sections to provide magnetic poles, a substantally U-shaped conductor mounted in a pair of said slots and substantially concentrically located circumferentially with respect to one of the sections of the auxiliary field windings, a relay supported by the ends of said conductor and having an electromagnet electrically connected to said ends, and a control element actuated by the electromagnet in response to voltage induced in said conductor.

5. In combination with a motor having a stator including a core, said core having slots therein and field windings in the slots, a preformed strip of conductive material mounted in a pair of said slots adjacent the windings therein, means insulating said strip from the windings, a control device haivng an electromagnet, and means electrically connecting the ends of said strip to the electromagnet so that the control device is responsive to the voltage induced in the strip.

6. In combination with a motor having a stator including a core, said core having a central opening therein and slots opening into said central opening, field windings in the slots, a preformed substantially U-shaped strip of conductive material mounted in a pair of said slots intermediate the windings and said central opening, means insulating the strip from the core, means insulating the strip from the windings, a motor control device having an actuating electromagnet, and means electrically connecting the ends of said strip to the electromagnet so that the control device is responsive to the voltage induced in the strip.

7. In combination with a motor having a stator including a core, said core having a central opening therein and slots opening into said central opening, main and auxiliary field windings in said slots, a preformed and substantially U-shaped strip of conductive material mounted in a pair of said slots adjacent portions of the auxiliary field winding and intermediate the winding and the central opening, a strip of insulating material intermediate in the slots with said strip of conductive material intermediate the strip of conductve material and the central opening, means insulating the strip of conductive material from the field winding, means insulating the winding and strip of conductive material from the core, a motor control device having an actuating electromagnet, and means electrically connecting the ends of the strip to the electromagnet so that the control device is responsive to the voltage induced in the strip.

CALVIN J. WERNER.